United States Patent
Kopperla et al.

(10) Patent No.: US 12,414,036 B2
(45) Date of Patent: Sep. 9, 2025

(54) METHOD AND SYSTEM FOR CONTROLLING USER EQUIPMENT POLICY IN WIRELESS NETWORK

(71) Applicant: Samsung Electronics Co., Ltd., Suwon-si (KR)

(72) Inventors: Ranjith Kumar Kopperla, Bangalore (IN); Rajesh Challa, Bangalore (IN); Dinakar Reddy Yammanuru, Bangalore (IN); Anmol Soy, Bangalore (IN); Medisetti Pattabhi Ramayya, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 698 days.

(21) Appl. No.: 17/720,940

(22) Filed: Apr. 14, 2022

(65) Prior Publication Data
US 2022/0338105 A1 Oct. 20, 2022

(30) Foreign Application Priority Data
Apr. 15, 2021 (IN) .............................. 202141017574
Apr. 8, 2022 (IN) .............................. 2021 41017574

(51) Int. Cl.
*H04L 12/24* (2006.01)
*H04W 24/02* (2009.01)
*H04W 48/16* (2009.01)
*H04W 48/18* (2009.01)
*H04W 84/12* (2009.01)

(52) U.S. Cl.
CPC ........... *H04W 48/16* (2013.01); *H04W 48/18* (2013.01); *H04W 84/12* (2013.01)

(58) Field of Classification Search
CPC ..... H04W 48/16; H04W 48/18; H04W 84/12; H04W 24/10; H04W 24/02; H04W 88/06; H04L 41/0894
See application file for complete search history.

(56) References Cited

U.S. PATENT DOCUMENTS

| 10,321,305 | B2 | 6/2019 | Yang et al. |
| 11,367,561 | B2* | 6/2022 | Lim .................... H01F 17/0013 |
| 11,647,124 | B2* | 5/2023 | Sun ........................ H04M 15/66 |
| | | | 370/329 |
| 11,647,446 | B2* | 5/2023 | Tang ..................... H04W 48/12 |
| | | | 370/328 |
| 11,832,104 | B2* | 11/2023 | Liao ........................ H04L 63/20 |
| 12,069,556 | B2* | 8/2024 | Xu ....................... H04W 40/248 |

(Continued)

FOREIGN PATENT DOCUMENTS

WO    WO-2020001757 A1 *  1/2020

OTHER PUBLICATIONS

Indian Office Action dated Nov. 15, 2022, issued in Indian Patent Application No. 202141017574.

*Primary Examiner* — Sithu Ko
(74) *Attorney, Agent, or Firm* — Jefferson IP Law, LLP

(57) ABSTRACT

A method for controlling a User Equipment (UE) policy by a UE is provided. A method includes receiving the UE policy from a Policy Control Function (PCF), performing a first action in response to receiving the UE policy from a successful execution of the received UE policy, a failed execution of the received UE policy, and storing of the received UE policy, and transmitting a feedback message to the PCF based on the first action.

16 Claims, 12 Drawing Sheets

(56) References Cited

U.S. PATENT DOCUMENTS

| | | |
|---|---|---|
| 2019/0116520 A1 | 4/2019 | Chaponniere et al. |
| 2020/0213876 A1* | 7/2020 | Sun .................... H04L 12/1407 |
| 2020/0344359 A1 | 10/2020 | Sun et al. |
| 2020/0404107 A1 | 12/2020 | Cheng et al. |
| 2020/0412559 A1 | 12/2020 | Tang |
| 2021/0037380 A1 | 2/2021 | Lee et al. |
| 2023/0188245 A1* | 6/2023 | Shin ................. H04W 56/0045 370/277 |

\* cited by examiner

METHOD AND SYSTEM FOR CONTROLLING USER EQUIPMENT POLICY IN WIRELESS NETWORK

CROSS-REFERENCE TO RELATED APPLICATION(S)

This application is based on and claims priority under 35 U.S.C. § 119(a) of an Indian Provisional patent application number 202141017574, filed on Apr. 15, 2021, in the Indian Patent Office, and of an Indian Complete patent application number 202141017574, filed on Apr. 8, 2022, in the Indian Patent Office, the disclosure of each of which is incorporated by reference herein in its entirety.

BACKGROUND

1. Field

The disclosure relates to a wireless network. More particularly, the disclosure relates to a method and a system for controlling User Equipment (UE) policy in the wireless network.

2. Description of Related Art

According to an existing $3^{rd}$ Generation Partnership Project (3GPP) architecture, a Policy Control Function (PCF) provides a plurality of PCF policies to various network entities. For example, the PCF provides an Access and Mobility Management (AM) policy to an Access and Mobility Management Function (AMF), a Session Management (SM) policy to a Session Management Function (SMF), and a UE policy to a User Equipment (UE). When the SMF receives the SM policy from the PCF, the SMF configures the SM policy depending on a criteria specified in the SM policy. The SMF then provides, based on trigger configuration, a status of configuring the SM policy (e.g., successfully configure the SM policy, fail to configure the SM policy, store the SM policy, etc.) to the PCF. As a result, the PCF is able to re-configure the SM policy based on the received status whenever it is necessary to improve SMF-related services. In the existing 3GPP architecture, the same mechanism is not provided for the UE policy. As a result, the PCF will never aware of the status of the provided UE policy and may not re-configure the UE policy even it is necessary to improve UE-related services.

Thus, it is desired to address the above-mentioned disadvantages or other shortcomings or at least provide a useful alternative for controlling the UE policy.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transmitting a feedback message, by a User Equipment (UE), to a Policy Control Function (PCF) when the UE tries to install and/or use a UE policy (UE policies). The feedback message indicates status information of the received UE policy. The status information includes successful execution of the received UE policy, failed execution of the received UE policy, a reason for not to use the received UE policy, storage information of the received UE policy, a reason for use the received UE policy, time information for successful execution, time information for failed execution, storage of the received UE policy, and location information for successful execution, and location information for failed execution. Further, the PCF controls the UE policy (e.g. modify/delete/recreate) based on the received feedback message to improve UE-related services, optimize network resources, predict overload on a network and improve Quality of Service (QoS)/Quality of Experience (QoE).

Additional aspects will be set forth in part in the description which follows and, in part, will be apparent from the description, or may be learned by practice of the presented embodiments.

In accordance with an aspect of the disclosure, a method for controlling a User Equipment (UE) policy by a UE in a wireless network is provided. The method includes receiving the UE policy from a Policy Control Function (PCF), performing, in response to receiving the UE policy, a first action from a successful execution of the received UE policy, a failed execution of the received UE policy, and storing of the received UE policy, and transmitting a feedback message to the PCF based on the first action.

In an embodiment, the method includes controlling, by the PCF, the UE policy based on the received feedback message, where the PCF performs a second action in response to receiving the feedback message, the second action includes, but are not limited to, a modification of the UE policy, a deletion of the UE policy, a recreation of the UE policy, and do nothing (for example, keep counting until the threshold is reached) and then perform the above mentioned actions in a manner similar to this. Further, the method includes transmitting, by the PCF, a new UE policy to the UE based on the second action.

In an embodiment, the UE policy includes a UE Route Selection Policy (URSP) and a Wireless Local Area Network Selection Policy (WLANSP).

In an embodiment, the URSP includes a storage mechanism for the feedback message, wherein the feedback message includes a plurality of status notification, the plurality of status notification classifies in various categories. The various categories includes, but are not limited to, a failure, alert, warning, mixed criteria based on parameters including Identity (ID), timeline, notification status, slices, sub slices, geospatial data, or any other customized dynamic metadata or condition, and the various categories used as query filter criteria. The PCF or any other relevant entity (e.g., AMF, SMF) access a subset of relevant notifications based on the filter criteria.

In an embodiment, the URSP includes a Session and Service Continuity (SSC) Mode Selection Policy (SSCMSP), a Network Slice Selection Policy (NSSP), a Data Network Name (DNN) selection policy, a Protocol Data Unit (PDU) session type policy, a non-seamless offload policy, and an access type preference policy.

In an embodiment, the feedback message includes a reason for failed execution of the received UE policy.

In an embodiment, the modification of the UE policy includes receiving, by the PCF, the feedback message from the UE, where the feedback message indicates the failed execution of the received UE policy at the UE, determining, by the PCF, whether a number of feedback message from the UE is greater than a threshold value (e.g., threshold value refers to the number of UEs that failed (or sent failure feedback message)), and modifying, by the PCF, the UE policy in response to determining that the number of feedback message from the UE is greater than the threshold value.

In an embodiment, the method includes a cloud-native mechanism and a server less mechanism.

In accordance with another aspect of the disclosure, a UE for controlling the UE policy in the wireless network is provided. The UE includes a memory, and at least one processor coupled to the memory. The at least one processor is configured to receive the UE policy from the PCF, perform, in response to receiving the UE policy, a first action from the successful execution of the received UE policy, the failed execution of the received UE policy, and storing of the received UE policy, and transmit the feedback message to the PCF based on the first action.

In accordance with another aspect of the disclosure, a PCF for controlling the UE policy in the wireless network is provided. The PCF includes a memory, and at least one processor coupled to the memory. The at least one processor is configured to transmit the UE policy to the UE, wherein the UE performs the first action in response to receiving the UE policy, and the first action includes, but are not limited to, the successful execution of the received UE policy, the failed execution of the received UE policy, and storing of the received UE policy, receive the feedback message from the UE based on the first action, control the UE policy based on the received feedback message, wherein the PCF performs the second action in response to receiving the feedback message, the second action includes, but are not limited to, the modification of the UE policy, the deletion of the UE policy, the recreation of the UE policy, and do nothing (for example, keep counting until the threshold is reached) and then perform the above mentioned actions in a manner similar to this, and transmit the new UE policy to the UE based on the second action.

Other aspects, advantages, and salient features of the disclosure will be become apparent to those skilled in the art from the following detailed description, which, taken in conjunction with the annexed drawings, discloses various embodiments of the disclosure.

BRIEF DESCRIPTION OF THE DRAWINGS

This above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
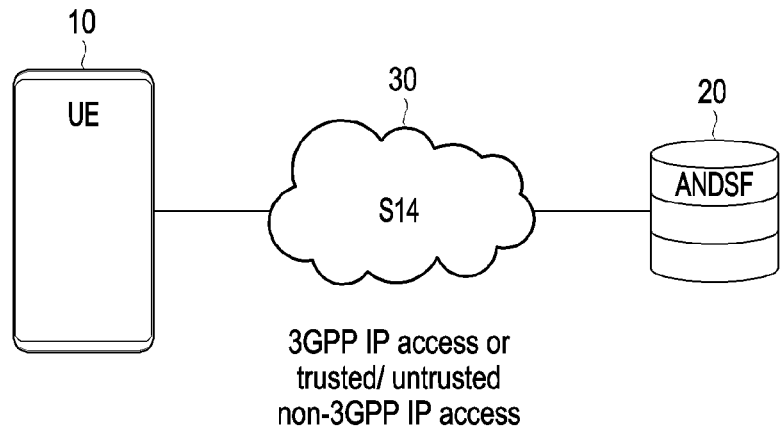
FIGS. 1A, 1B, and 1C are illustrations in which an Access network discovery and selection function (ANDSF) provides User Equipment (UE) policies to a UE in a Fourth Generation (4G) network, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the embodiment use for "UE policy" also applicable to "UE policies".

Figure 1B:
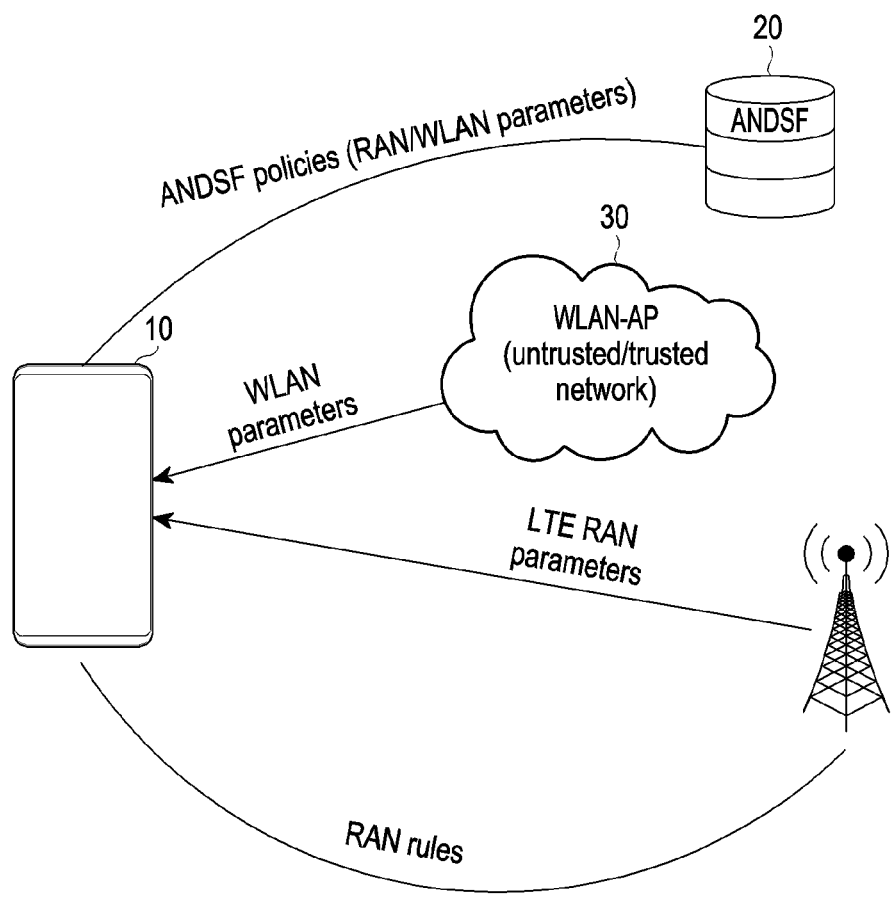
Figure 1C:
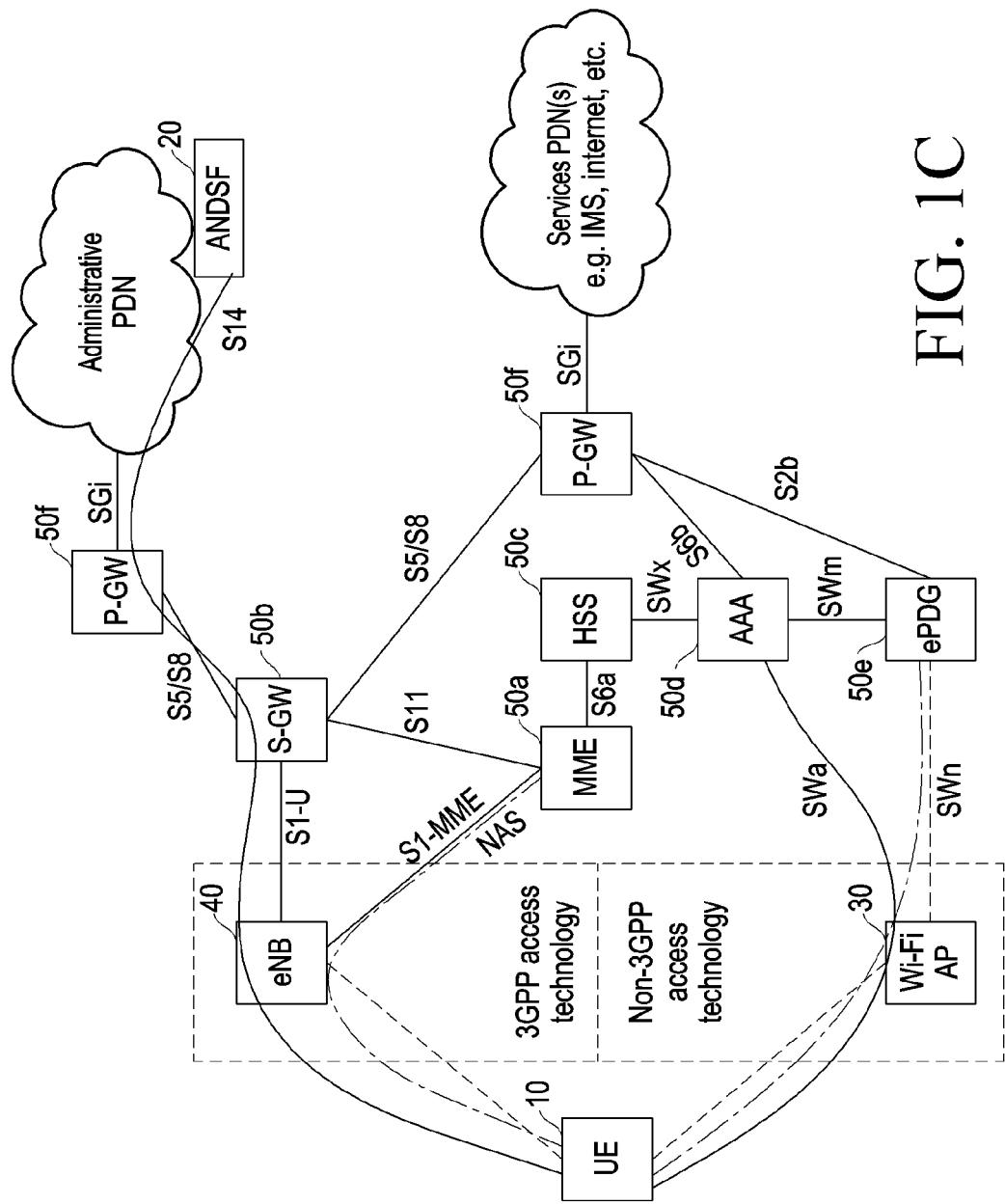

FIGS. 1A, 1B, and 1C are illustrations in which an Access network discovery and selection function (ANDSF) provides User Equipment (UE) policies to a UE in a Fourth Generation (4G) network, according to the related art.

Referring to FIG. 1A, the ANDSF 20 is a network server that offers the UE policies and network selection information to the UE 10 as defined in 3GPP TS 23.402. The ANDSF 20 provides a framework for creating, delivering, and implementing network policies on wireless devices. Furthermore, the ANDSF 20 provides a framework for designing, delivering, and implementing network rules on the wireless devices via an S14 interface, where the S14 interface is based on an Open Mobile Alliance-Device Management application layer protocol (OMA-DM).

Referring to FIG. 1B, the ANDSF 20 may be found using a Domain Name System (DNS), a Dynamic Host Configuration Protocol (DHCP), and provisioned. The UE 10 will connect to the ANDSF 20 via a packet data network (PDN) Gate Way (PGW)/Radio Access Network (RAN) to obtain the UE policies. The UE policies can be retrieved or obtained using a push/pull mode.

Referring to FIG. 1C, all interfaces (e.g. SWn, SWa, SWm, S2b, SGi, SWx, S6b, S6a, S5, S8, S14, etc.), between the UE 10 and administrative PDN/services PDN for 3GPP access technology and non-3GPP access technology are defined in 3GPP TS 24.302. The system of FIG. 1C, may also include a Wi-Fi Access point 30, an eNB 50, a Mobility Management Entity (MME) 50a, a serving gateway (S-GW) 50b, a Home Subscriber Server (HSS) 50c, Authentication, Authorization and Accounting network 50d, volved Packet Data Gateway (ePDG) 50e, and Packet Data Network Gateway (P-GW) 50f.

Figure 2A:
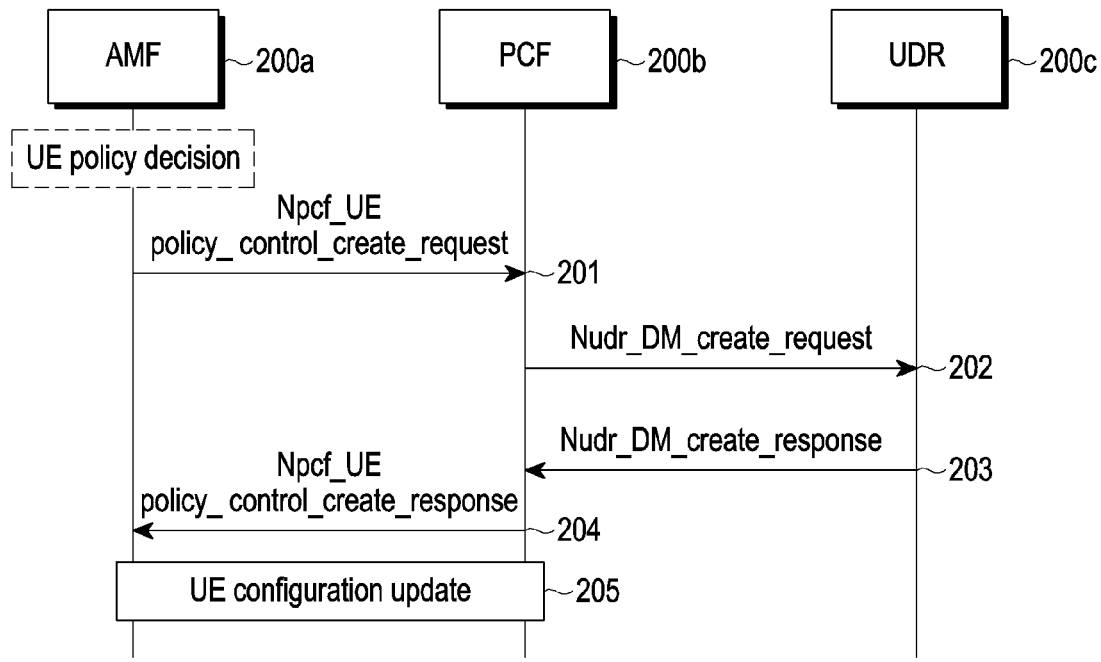
FIGS. 2A and 2B illustrate UE policy creation in a 5G network, according to the related art.
Figure 2B:
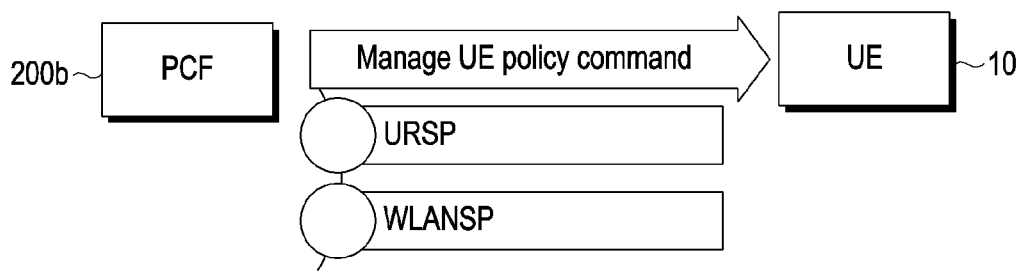

FIGS. 2A and 2B illustrate UE policy (UE policies) creation in a 5G network, according to the related art. The 5G network includes an Access and Mobility Management Function (AMF) 200a, a Policy Control Function (PCF) 200b, and a User Data Repository (UDR) 200c to create/distribute/configure the UE policy in the 5G network. According to the existing 3GPP architecture, there are several operations 201-205 to generate the UE policy (UE policies) are described in FIG. 2B.

Referring to FIG. 2A, at operation 201, the AMF 200a sends a Npcf_UE Policy control create request to the PCF 200b based on a UE state indication and UE policy decision. For example, when the UE 10 registers and a UE context is established, the AMF 200a can obtain from the UE 10 a "UE state indication" message of the UE policy delivery protocol defined in 3GPP TS 24.501 and decide whether to establish the UE policy association with the PCF 200b based on local policies and that message. At operation 202, the PCF 200b sends a Nudr_DM_create_request to the UDR 200c for storing the policy-related information. At operation 203 the UDR 200c sends a Nudr_DM_create_response to the PCF 200b in response to storing the policy-related information. At operations 204 and 205, the PCF 200b sends a Npcf_UE_policy_control create response (e.g., UE policies) to the UE 10 (not shown in FIG. 2A) transparently via the AMF 200a using UE configuration update procedure, according to 3GPP TS 23.502. A communication protocol defined between the UE 10, the AMF 200a, and the PCF 200b (e.g., network attached storage (NAS) and a Network Policy Control Function (NPCF) policy) ensures only delivery of the UE policies at the UE. The UE policies (e.g. UE Route Selection Policy (URSP) and Wireless Local Area Network Selection Policy (WLANSP)) are stored at the UE 10. Usage of the UE policies can occur at a very later stage when an exact trigger or criteria is mentioned in a rule match, according to 3GPP TS 23.503. Similarly, the UE policies can be shared with other users based on a user profile registered with an operator.

The existing 3GPP architecture does not define about any feedback mechanism for the UE policy (UE policies). As a result, once the UE policy (UE policies) is generated in the 5G network or stored in the UE 10, then the PCF 200b and/or core network will never inform of status (e.g. successful installation or failure installation) of the generated/stored UE policy (UE policies), and the PCF 200b may not re-configure the UE policy (UE policies) whenever it is necessary to improve UE-related services.

Referring to FIG. 2B, the UE 10 receives the UE policy (e.g. manage UE policy command) (UE policies) (e.g., the WLANSP and the URSP) from the PCF 200b and stores the revived UE policy (UE policies) in a memory of the UE 10.

Figure 3A:
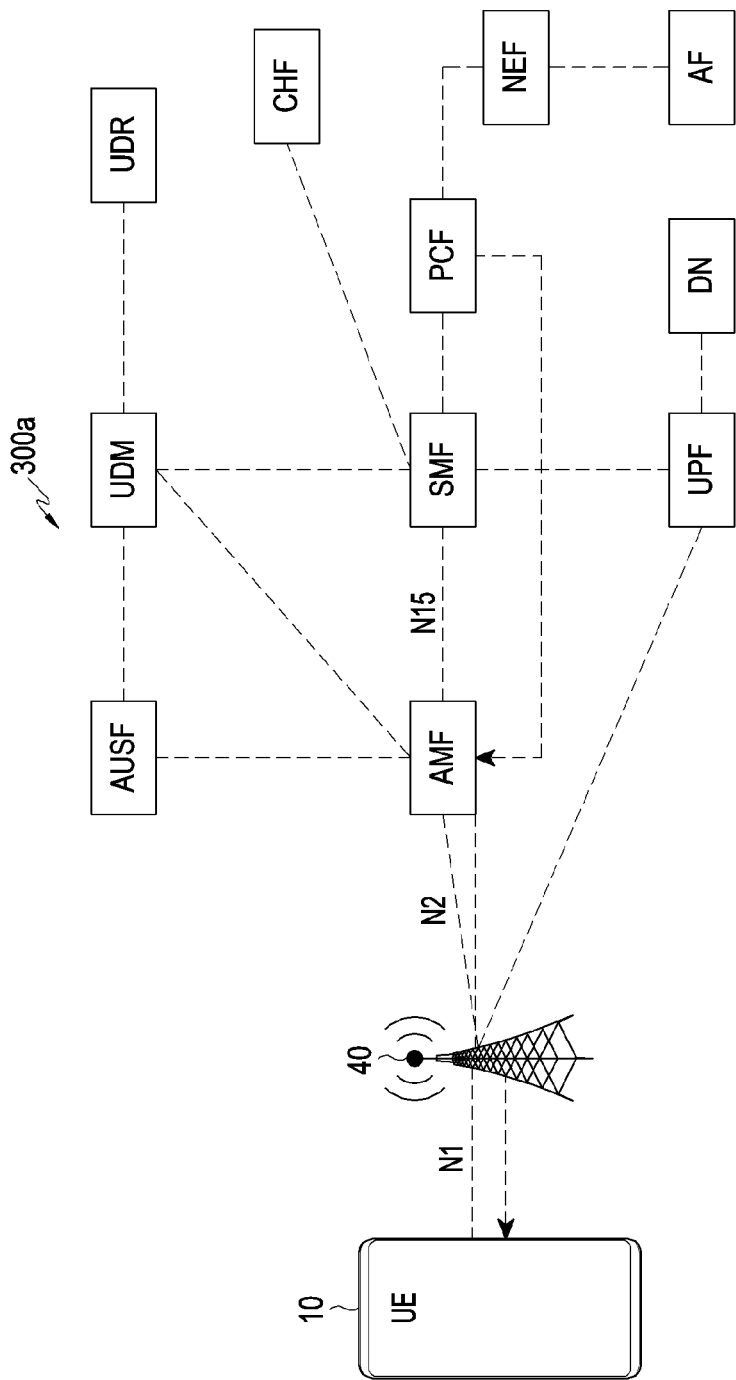
FIGS. 3A, 3B, and 3C illustrate a UE Route Selection Policy (URSP) flow and a drawback of an existing UE policy, according to the related art.
Figure 3B:
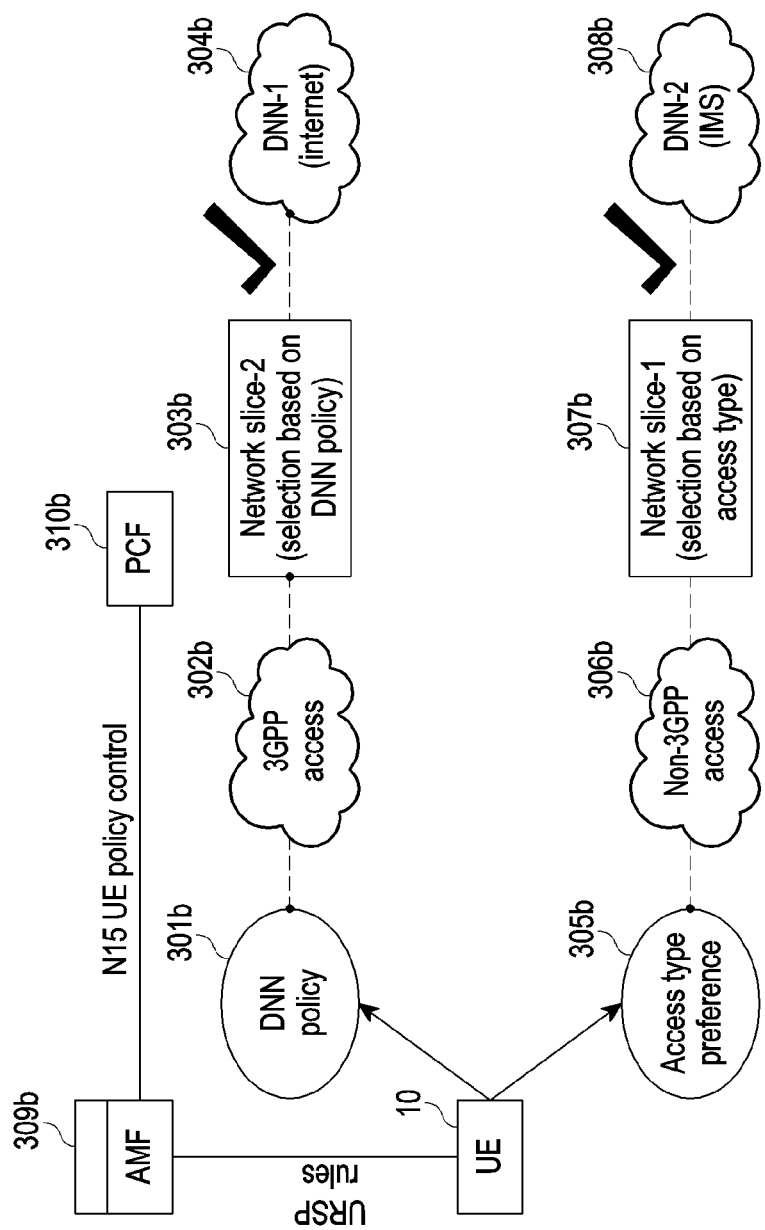
Figure 3C:
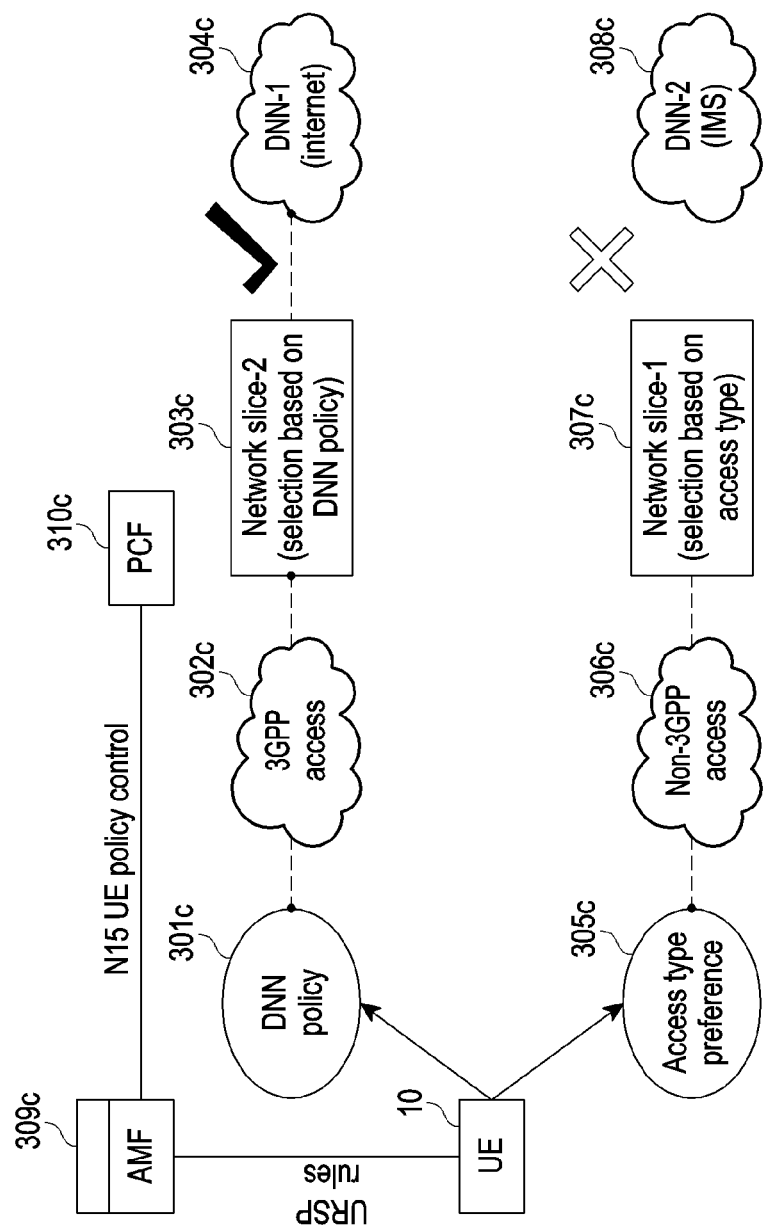

FIGS. 3A, 3B, and 3C illustrates a URSP flow and a drawback of an existing UE policy, according to the related art.

Referring to FIG. 3A, the UE 10 utilizes several policies, including an SSC Mode Selection Strategy (SSCMSP), a Network Slice Selection Policy (NSSP), a Data Network Name (DNN) selection policy, a Protocol Data Unit (PDU) session type policy, a non-seamless offload policy, and an access type preference policy. All illustrated interfaces between various entities (e.g. AMF, SMF, PCF, etc.) is same as provided in 3GPP TS 23.501. The SSCMSP is used by the UE 10 to associate a matching application with SSC modes. The NSSP is used by the UE 10 to associate the matching application with an SNSSAI. The DNN selection policy is used by the UE 10 to associate the matching application with a DNN. The PDU session type policy is used by the UE 10 to associate the matching application with a PDU session type. The non-seamless offload policy is used by the UE 10 to determine that the matching application should be non-seamlessly offloaded to non-3GPP access (i.e., outside of a PDU session). If the UE 10 needs to establish a PDU session for the matching application, the access type preference policy indicates a preferred access type (e.g., 3GPP access or non-3GPP access).

Referring to FIG. 3B, in this example, the UE 10 receives the UE policies (e.g., DNN selection policy, access type preference policy) from the PCF 310b via the AMF 309b and successfully deploys the UE policies to access various network functionality (e.g. DNN). When the UE policies are received, the UE 10 successfully attempts to access a DNN-1 304b via a 3GPP access 302b and a network slice-2 303b using the received DNN policy 301b and a DNN-2 308b via non-3GPP access 306b and a network slice-1 307b using the received access type preference policy 305b. Because of the successful installation of the UE policies and the appropriate connection between each node, the UE 10 utilizes the various network functionalities in this example scenario.

In the existing 3GPP architecture, there is no feedback mechanism for the UE policy (UE policies). Once the PCF 310b shares the UE policy to the UE 10, the PCF 310b has no knowledge of the shared UE policy (UE policies). For example, the PCF 310 has no idea when the shared UE policy (UE policies) is utilized, where the shared UE policy (UE policies) is utilized, or under what conditions the shared UE policy (UE policies) is utilized. So, the PCF 310b never reconfigure the UE policy (UE policies) which is a major drawback in the existing 3GPP architecture.

Referring to FIG. 3C, in this example, the UE 10 receives the UE policies (e.g., DNN selection policy, access type preference policy) from the PCF 310c via the AMF 309c and deploys the UE policies to access various network functionality (e.g. DNN). When the UE policies are received, the UE 10 successfully attempts to access a DNN-1 304c via a 3GPP access 302c and a network slice-2 303c using the received DNN policy 301c). The UE 10 fail to access a DNN-2 308c via non-3GPP access 306c and a network slice-1 307c using the received access type preference policy 305c due to some reason (e.g. creation of the PDU based on the UE policy failed at the AMF/SMF).

To resolve a failure situation, the UE 10 should notify the PCF 310c so that the appropriate actions may be taken by the PCF 310c to avoid a failure situation in a future, but this type of feedback mechanism is not provided for the UE policy (UE policies) in the existing 3GPP architecture.

Furthermore, the PCF 310c is a single source of truth for all policies. These policies have a significant impact on a Network Data Analytics Function (NWDAF) analytics. However, unlike the SM policies, the UE policies do not manage error/feedback. The implications of this limitation are as follows:

a. Poor network intelligence/prediction because of the network requirement for another source of truth (i.e., UE) to provide feedback for closed loop automation.

b. Access Traffic Steering, Switching & Splitting (ATSSS) feature handling may be inconsistent (3GPP TS 24.193). The UE may be provided a specific UE policy from the PCF (for example, which access to use at what time of day and location), but the ATSSS-related requests may be out of sync.

c. Uneven UE requests (not in sync with whatever the PCF sent to UE via a UE policy).

d. There are few opportunities for the network to detect an anomaly. If UE is unable to follow the directions provided in UE policy (e.g., use non-3GPP access to particular application such as online video application while still accessing LTE/5G services). The network has no idea why the UE is not obeying the instructions, whether it's due to a problem with non-3GPP access in the area where the UE is now located or any other network issues.

e. The PCF may continue to assign the same policy to millions of UEs, resulting in a very unsatisfied user experience.

f. The network is unable to make dynamic judgments to update/modify/delete or even develop new regulations, as it could if feedback had been received.

Accordingly, embodiments herein disclose a method for controlling the User Equipment (UE) policy by the UE in a wireless network. The method includes receiving, by the UE, the UE policy from the PCF. Further, the method includes performing, by the UE, a first action in response to receiving the UE policy, where the first action includes, but are not limited to, a successful execution of the received UE policy, a failed execution of the received UE policy, and storing of the received UE policy. Further, the method includes sending, by the UE, a feedback message to the PCF based on the first action.

Accordingly, embodiments herein disclose the UE for controlling the UE policy in the wireless network. The UE includes a policy controller coupled with a processor and a memory. The policy controller receives the UE policy from the PCF. Further, the policy controller performs the first action in response to receiving the UE policy, where the first action includes, but are not limited to, the successful execution of the received UE policy, the failed execution of the received UE policy, and storing of the received UE policy. Further, the policy controller sends the feedback message to the PCF based on the first action.

Accordingly, embodiments herein disclose the PCF for controlling the UE policy in the wireless network. The PCF includes a policy controller coupled with a processor and a memory. The policy controller sends the UE policy to the UE, where the UE performs the first action in response to receiving the UE policy, where the first action includes, but are not limited to, the successful execution of the received UE policy, the failed execution of the received UE policy, and the storing of the received UE policy. Further, the policy controller receives the feedback message from the UE based on the first action. Further, the policy controller controls the UE policy based on the received feedback message, where the PCF performs the second action in response to receiving the feedback message, the second action includes, but are not limited to, a modification of the UE policy, a deletion of the UE policy, a recreation of the UE policy, and do nothing (for example, keep counting until the threshold is reached) and then perform the above mentioned actions in a manner similar to this. Further, the policy controller sends the new UE policy to the UE based on the second action.

Unlike existing methods and systems, the proposed method allows the UE to send the feedback message to the PCF when the UE tries to install and/or use the UE policy (UE policies). The feedback message indicates status information of the received UE policy. The status information includes successful execution of the received UE policy, failed execution of the received UE policy, a reason for not to use the received UE policy, storage information of the received UE policy, a reason for use the received UE policy, time information for successful execution, time information for failed execution, storage of the received UE policy, and location information for successful execution and location information for failed execution. Further, the PCF controls the UE policy (e.g. modify/delete/recreate) based on the received feedback message to improve UE-related services, optimize network resources, predict overload on a network and improve Quality of Service (QoS)/Quality of Experience (QoE).

Referring now to the drawings, and more particularly to FIGS. 4 through 9, where similar reference characters denote corresponding features consistently throughout the figures, there are shown preferred embodiments.

Figure 4:
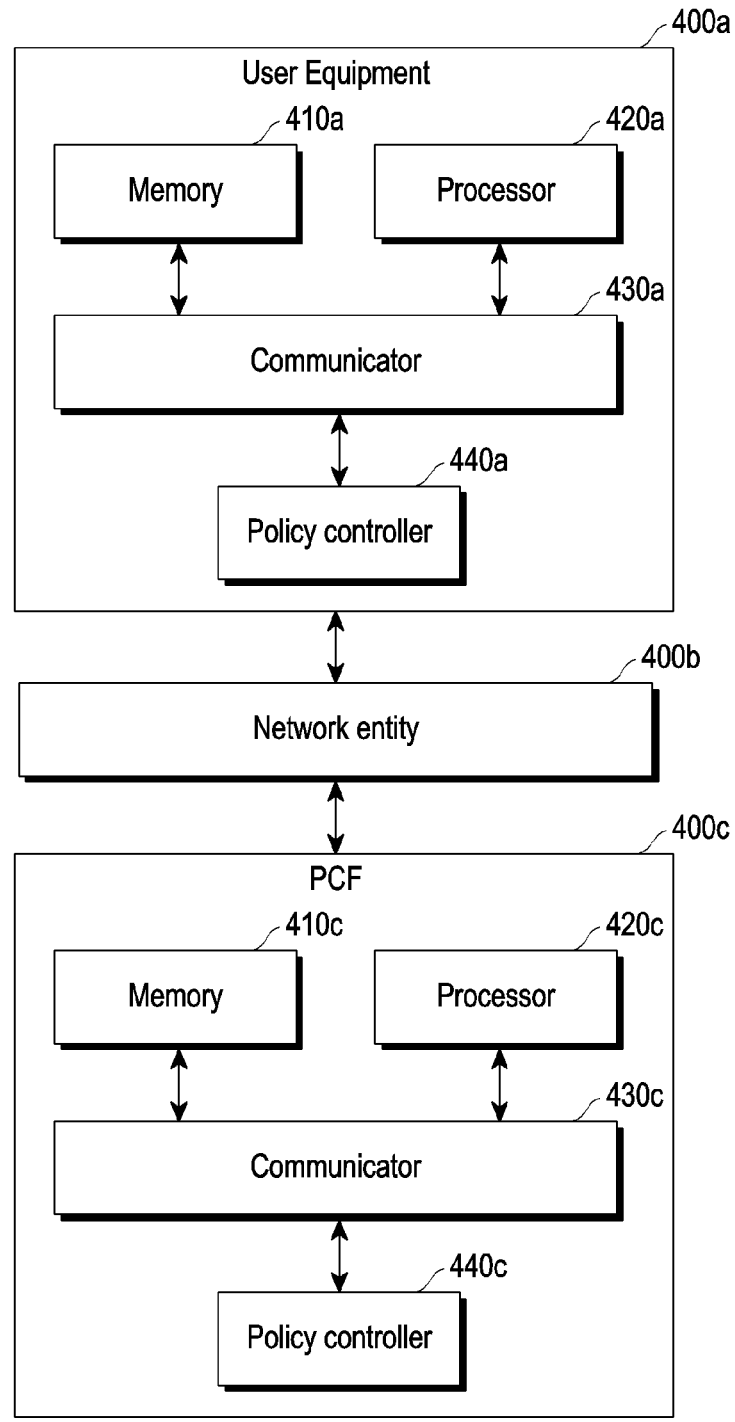
FIG. 4 is a block diagram of a system for controlling a UE policy in a wireless network, according to an embodiment of the disclosure.

FIG. 4 is a block diagram of a system for controlling a UE policy in a wireless network, according to an embodiment of the disclosure. The system includes a UE 400*a*, a network entity 400*b*, and a PCF 400*c*.

Examples of the UE 400*a* include, but are not limited to a smartphone, a tablet computer, a Personal Digital Assistance (PDA), an Internet of Things (IoT) device, a wearable device, etc. Examples of the network entity 400*b* include, but are not limited to an Access and Mobility Management Function (AMF), a Session Management Function (SMF), a base station, a server, and an E-UTRAN Node B (eNodeB).

In an embodiment, the UE 400*a* includes a memory 410*a*, a processor 420*a*, a communicator 430*a*, and a policy controller 440*a*.

In an embodiment, the memory 410*a* stores a UE policy, information related to a first action, a threshold value, and a new UE policy. The memory 410*a* stores instructions to be executed by the processor 420*a*. The memory 410*a* may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 410*a* may, in some examples, be considered a non-transitory storage medium. The term "non-transitory" may indicate that the storage medium is not embodied in a carrier wave or a propagated signal. However, the term "non-transitory" should not be interpreted that the memory 410*a* is non-movable. In some examples, the memory 410*a* can be configured to store larger amounts of information than the memory. In certain examples, a non-transitory storage medium may store data that can, over time, change (e.g., in Random Access Memory (RAM) or cache). The memory 410*a* can be an internal storage unit or it can be an external storage unit of the UE 400*a*, a cloud storage, or any other type of external storage.

The processor 420*a* communicates with the memory 410*a*, the communicator 430*a*, and the policy controller 440*a*. The processor 420*a* is configured to execute instructions stored in the memory 410*a* and to perform various processes. The processor 420*a* may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 430*a* is configured for communicating internally between internal hardware components and with external devices (e.g. eNodeB, gNodeB, server, PCF, network entity, etc.) via one or more networks (e.g. Radio technology). The communicator 430*a* includes an electronic circuit specific to a standard that enables wired or wireless communication. The communicator 430*a* may be referred to as a transceiver.

The policy controller 440*a* is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. In some embodiments, the policy controller 440*a* is included in the processor 420*a*. The operations of the policy controller 440*a* are also understood as operations executed by the processor 420*a*.

In an embodiment, the policy controller 440*a* receives the UE policy from the PCF 400*c*. The UE policy includes a UE Route Selection Policy (URSP) and a Wireless Local Area Network Selection Policy (WLANSP). The URSP can include a SSC Mode Selection Policy (SSCMSP), a Network Slice Selection Policy (NSSP), a Data Network Name (DNN) selection policy, a Protocol Data Unit (PDU) session type policy, a non-seamless offload policy, and an access type preference policy. The URSP rule may include 1 or more modes, it is not necessary to include all the above mentioned modes. Furthermore, the policy controller 440*a* performs the first action in response to receiving the UE policy, where the first action includes, but are not limited to, a successful execution of the received UE policy or a failed execution of the received UE policy, or storing of the received UE policy. Furthermore, the policy controller 440*a* sends a feedback message to the PCF 400*c* based on the first action through the network entity 400*b*. The feedback message includes a reason for failed execution and/or a reason for successful execution and/or storage of the received UE policy and/or location information for successful execution and/or location information for failed execution and/or time information for successful execution and/or time information for failed execution.

In an embodiment, the PCF 400*c* includes a memory 410*c*, a processor 420*c*, a communicator 430*c*, and a policy controller 440*c*.

In an embodiment, the memory 410*c* stores information related to a second action, the UE policy, the information related to the first action, the threshold value, and the new UE policy. The memory 410*c* stores instructions to be executed by the processor 420*c*. The memory 410*c* may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 410*c* may, in some examples, be considered a non-transitory storage medium. The term "non-transitory" may indicate that the storage medium is not embodied in a carrier wave or a propagated signal. However, the term "non-transitory" should not be interpreted that the memory 410*c* is non-movable. In some examples, the memory 410*c* can be configured to store larger amounts of information than the memory. In certain examples, a non-transitory storage medium may store data that can, over time, change (e.g., in Random Access Memory (RAM) or cache). The memory 410*c* can be an internal storage unit or it can be an external storage unit of the PCF 400*c*, a cloud storage, or any other type of external storage.

The processor 420*c* communicates with the memory 410*c*, the communicator 430*c*, and the policy controller 440*c*. The processor 420*c* is configured to execute instructions stored in the memory 410*c* and to perform various processes. The processor 420*c* may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 430*c* is configured for communicating internally between internal hardware components and with external devices (e.g. eNodeB, gNodeB, server, UE, network entity, etc.) via one or more networks (e.g. Radio technology). The communicator 430*c* includes an electronic circuit specific to a standard that enables wired or wireless communication. The communicator 430*c* may be referred to as a transceiver.

The policy controller 440c is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. In some embodiments, the policy controller 440c is included in the processor 420c. The operations of the policy controller 440c are also understood as operations executed by the processor 420c.

In an embodiment, the policy controller 440c sends the UE policy to the UE 400a, where the UE 400a performs the first action in response to receiving the UE policy. Furthermore, the policy controller 440c receives the feedback message from the UE 400a based on the first action. Furthermore, the policy controller 440c controls the UE policy based on the received feedback message, where the PCF 400c performs the second action in response to receiving the feedback message. The second action includes, but are not limited to, a modification of the UE policy, a deletion of the UE policy, a recreation of the UE policy, and do nothing (for example, keep counting until the threshold is reached) and then perform the above mentioned actions in a manner similar to this. Furthermore, the policy controller 440c sends the new UE policy to the UE 400a based on the second action.

In an embodiment, the policy controller 440c modifies the UE policy when the policy controller 440c receives the feedback message from the UE 400a, where the feedback message indicates the failed execution of the received UE policy at the UE 400a. Furthermore, the policy controller 440c determines whether a number of feedback messages from the UE cloud-native mechanism and a server less mechanism.

Although FIG. 4 shows various hardware components of the system block diagram but it is to be understood that other embodiments are not limited thereon. In other embodiments, the system block diagram may include less or more number of components. Further, the labels or names of the components are used only for illustrative purpose and does not limit the scope of the disclosure. One or more components can be combined together to perform same or substantially similar function to control the UE policy in the wireless network.

Figure 5:
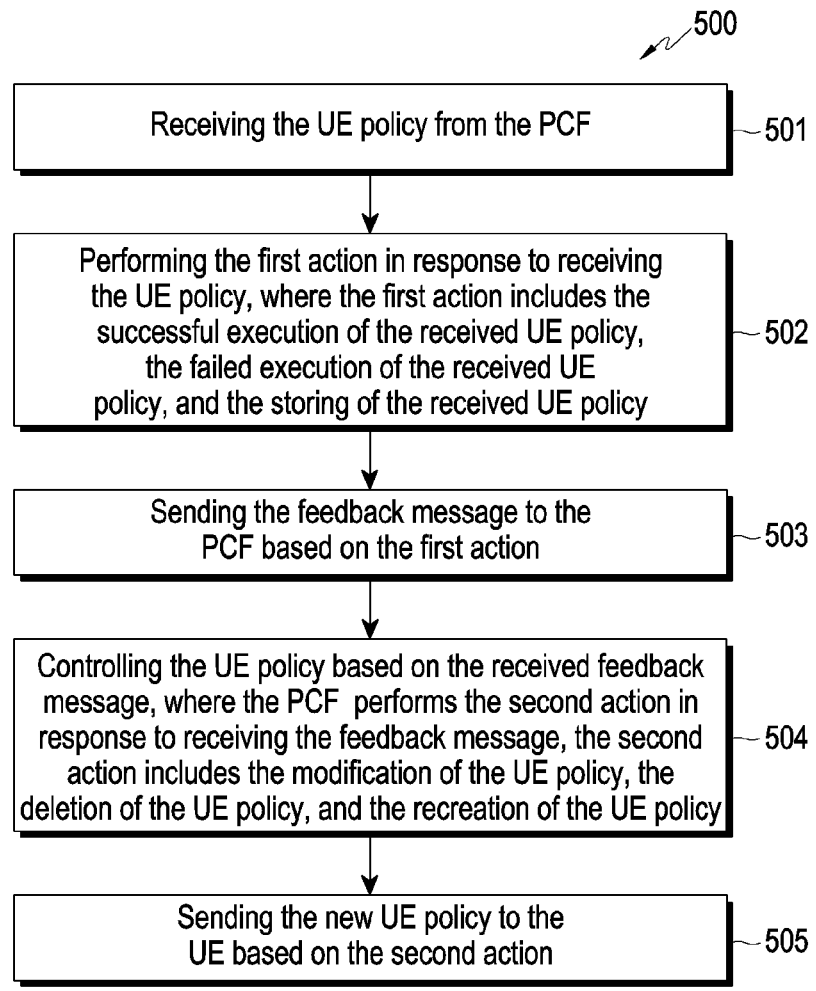
FIG. 5 is a flow diagram illustrating a method for controlling a UE policy in the wireless network, according to an embodiment of the disclosure.

FIG. 5 is a flow diagram illustrating a method for controlling a UE policy in a wireless network, according to an embodiment of the disclosure. The UE 400a and the PCF 400c perform various operations 501-505 to control the UE policy in the wireless network.

Referring to FIG. 5, in a method 500, at operation 501, the method includes receiving the UE policy from the PCF 400c. At operation 502, the method includes performing the first action in response to receiving the UE policy, where the first action includes, but are not limited to, the successful execution of the received UE policy, the failed execution of the received UE policy, and the storing of the received UE policy. At operation 503, the method includes sending the feedback message to the PCF 400c based on the first action. At operation 504, the method includes controlling the UE policy based on the received feedback message, where the PCF 400c performs the second action in response to receiving the feedback message, the second action includes, but are not limited to, the modification of the UE policy, the deletion of the UE policy, and the recreation of the UE policy. At operation 505, the method includes sending the new UE policy to the UE 400a based on the second action.

The various actions, acts, blocks, steps, or the like in the flow diagram 500 may be performed in the order presented, in a different order, or simultaneously. Further, in some embodiments, some of the actions, acts, blocks, steps, or the like may be omitted, added, modified, skipped, or the like without departing from the scope of the disclosure.

Figure 6:
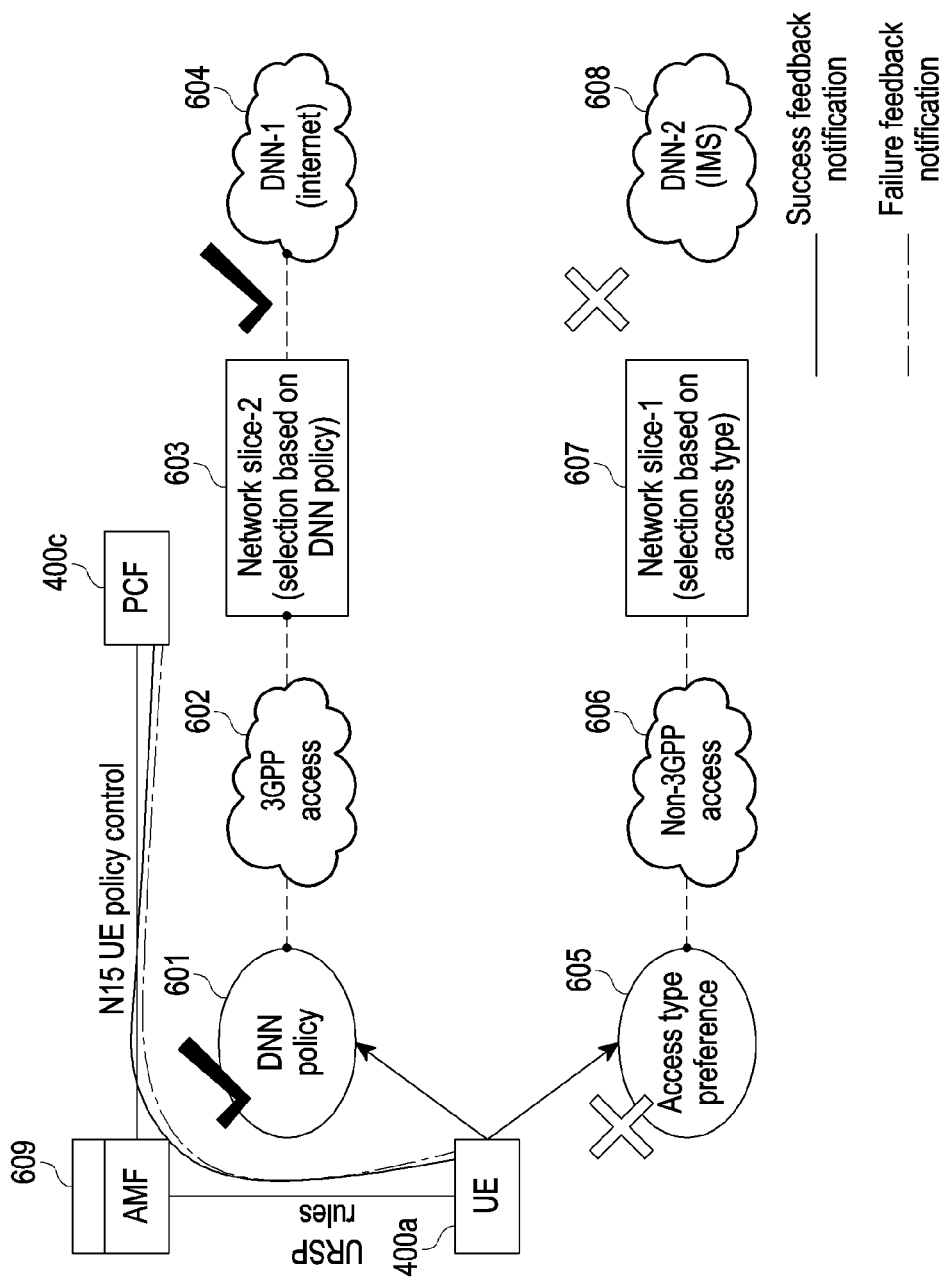
FIG. 6 illustrates a feedback mechanism to enhance an existing UE policy in a wireless network, according to an embodiment of the disclosure.

FIG. 6 illustrates a feedback mechanism to enhance an existing UE policy in a wireless network, according to an embodiment of the disclosure.

Referring to FIG. 6, the UE 400a receives the UE policies (e.g., DNN selection policy, access type preference policy) from the PCF 400c via the AMF 609 and deploys the UE policies to access various network functionality (e.g. DNN). When the UE policies are received, the UE 400a successfully attempts to access a DNN-1 604 via a 3GPP access 602 and a network slice-2 603 using the received DNN policy 601. The UE 400a fail to access a DNN-2 308c via non-3GPP access 606 and a network slice-1 607 using the received access type preference policy 605 due to some reason (e.g. creation of the PDU based on the UE policy failed at the AMF/SMF).

In the proposed method, the UE 400a sends a successful feedback notification to the PCF 400c when the UE 400a successfully attempts to access the DNN-1 604. The UE 400a sends a failure feedback notification to the PCF 400c when the UE 400a fails to access the DNN-2 608. As a result, the PCF is aware of the status (e.g., successful/failure) of the provided UE policy and re-configures the UE policy whenever it is necessary to improve UE-related services.

Consider an example scenario in which the UE 400a receives the WLANSP rule to connect to a non-3GPP network from the PCF 400c. The UE 400a tries to attach or perform a handover from a 3GPP network to the non-3GPP network, but it will not be successful because of an issue from the non-3GPP network such as unavailability of resource or temporary issue or network issue. So, the UE 400a does not utilize the WLANSP rule which is provided by the PCF 400c and/or core network. The UE 400a sends the feedback message to the PCF 400c, where the feedback message indicates that the WLANSP rule is not being used by the UE 400a with information (or said trigger condition when the UE 400a sends the feedback message). Examples of the information are given in Table 1.

TABLE 1

| Information/trigger condition | Description |
| --- | --- |
| Reason | Not able to install the WLANSP rule to connect to a non-3GPP network |
| Time information | Handover or non-3GPP attach failure. |
| Location information | Tracking area or SSID Information, timestamp, and other peripheral |

Consider another example scenario of watching online video through a video application in which the UE 400a receives the URSP rule to create a new PDN session when specific traffic is being observed. When a user of the UE 400a uses the video application, the UE 400a tries to establish the new PDN session based on the URSP rule. But the establishment of the new PDN session will not be successful. A reason for the failure is just known to the network entity 400b (e.g., AMF/SMF/UPF) and the UE 400a. So, the UE 400a does not utilize the URSP rule which is provided by the PCF 400c and/or core network. The UE 400a sends the feedback message to the PCF 400c, where the feedback message indicates that the URSP rule is not being used by the UE 400a with information (or said trigger condition when the UE 400a sends the feedback message). Examples of the information are given in Table 2.

TABLE 2

| Information/<br>trigger condition | Description |
|---|---|
| Reason | Not able to install the URSP rule to connect to establish the new PDN session |
| Time information | URSP installation failure is observed from the UE |
| Location information | Tracking area, timestamp, and other peripheral, where the failure is observed |

Consider another example scenario where a subscriber/set of subscribers are using a specific rule at a location. For example, when all employees are leaving an office and trying to open an application (e.g. video application, news application, etc.) in a specific area (ideal traffic-congested area at a specific timestamp). The UE 400a receives the URSP rule to create a new PDN session when specific traffic is being observed. Multiple subscribers open the application at the same timestamp and same location. Based on the provided URSP rules, multiple subscribers create an additional PDN Session and it is successful. The UE 400a sends the feedback message to the PCF 400c, where the feedback message indicates that the URSP rule is successfully installed. When the subscriber/set of subscribers closes the application, the new PDN session might be deleted based on the application not being used. The UE 400a sends the feedback message to the PCF 400c, where the feedback message indicates the URSP rule not being used by the UE 400a with information (or said trigger condition when the UE 400a sends the feedback message). Examples of the information are given in Table 3.

TABLE 3

| Information/<br>trigger condition | Description |
|---|---|
| Reason | The reason = Success or Failure. In case of Success, PCF can fetch the metadata that contains the detailed information which may include, but not limited to location, timestamp, demographics and so on. UE will not be aware other UEs who might be connected at the same time. |
| Time information | URSP installation successful is observed from the UE |
| Location information | Tracking area, timestamp, and other peripheral, where the success is observed |

Importance of UE policy feedback: Consider the following scenario in which the PCF 400c sends the URSP policy for the non-3GPP access selection based on a set of criteria. When the conditions are met, the UE 400a attempts to transition to the non-3GPP access but fails due to non-3GPP network difficulties. All UEs 400a migrating to the non-3GPP network due to the trigger conditions are failing due to non-3GPP network difficulties. Now, if this information is not communicated with the PCF 400c (an organization that assigns policies), the PCF 400c will continue to assign the same policy to millions of UEs 400a. In reality, the number of policies is limited (to three digits at most), implying that the policies are reused for a subset/group of subscribers. As a result of this failure, millions of subscribers will be impacted. The proposed method ensures that millions of UEs 400a are spared from failures before they occur. (It's not a prediction, but it's based on real values, and therefore accuracy if error corrections (self-learning/healing) are more). Eventually, this could become a standard application for self-healing or self-learning networks.

In an embodiment, the PCF 400c can understand the actual usage of the policies that are being applied in real-time. If the PCF 400c receives more than a certain number of failures, it can detect the misbehavior and adjust the UE policies that are delivered to the UE 400a. The PCF 400c can modify the UE policies using current mechanisms and send a UE Policy Modification (Network Initiated) message (i.e. feedback message). So that all previously connected UEs 400a may likewise modify/update the policy.

In an embodiment, the PCF 400c identifies failure patterns. Whether a certain subset of operating systems is failing for a given rule or policy, Whether or not failures are noticed in a particular location, Whether failures are observed just for a subset of user groups, Whether a given UE policy fails under a specific scenario, the pattern can be easily discovered and corrected.

Figure 7:
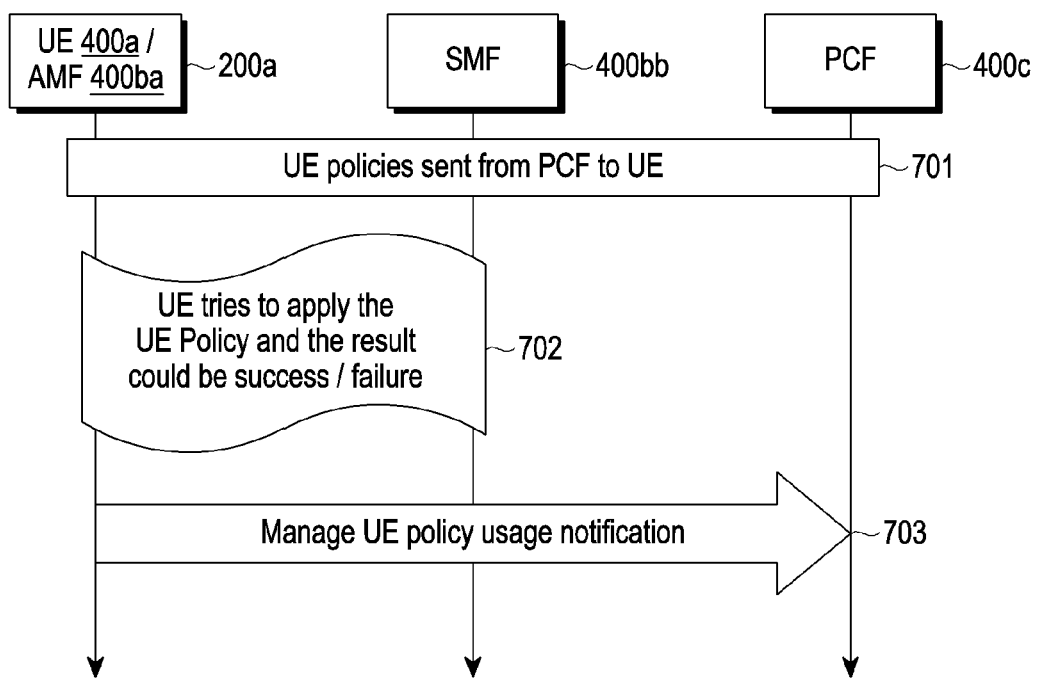
FIG. 7 is a sequence diagram illustrating a method for controlling a UE policy in a wireless network, according to an embodiment of the disclosure.

FIG. 7 is a sequence diagram illustrating a method for controlling a UE policy in a wireless network, according to an embodiment of the disclosure.

Referring to FIG. 7, at 701, the PCF 400c sends the UE policies to the UE 400a as a part of an existing message(s). At 702-703, the UE 400a tries to implement the UE policy rule based on criteria mentioned in an instruction of the existing message(s) and sends the feedback message (e.g. manage UE policy usage notification message) to the PCF 400c. The PCF 400c updates/deletes/recreates the UE policy based on the received feedback message.

Figure 8:
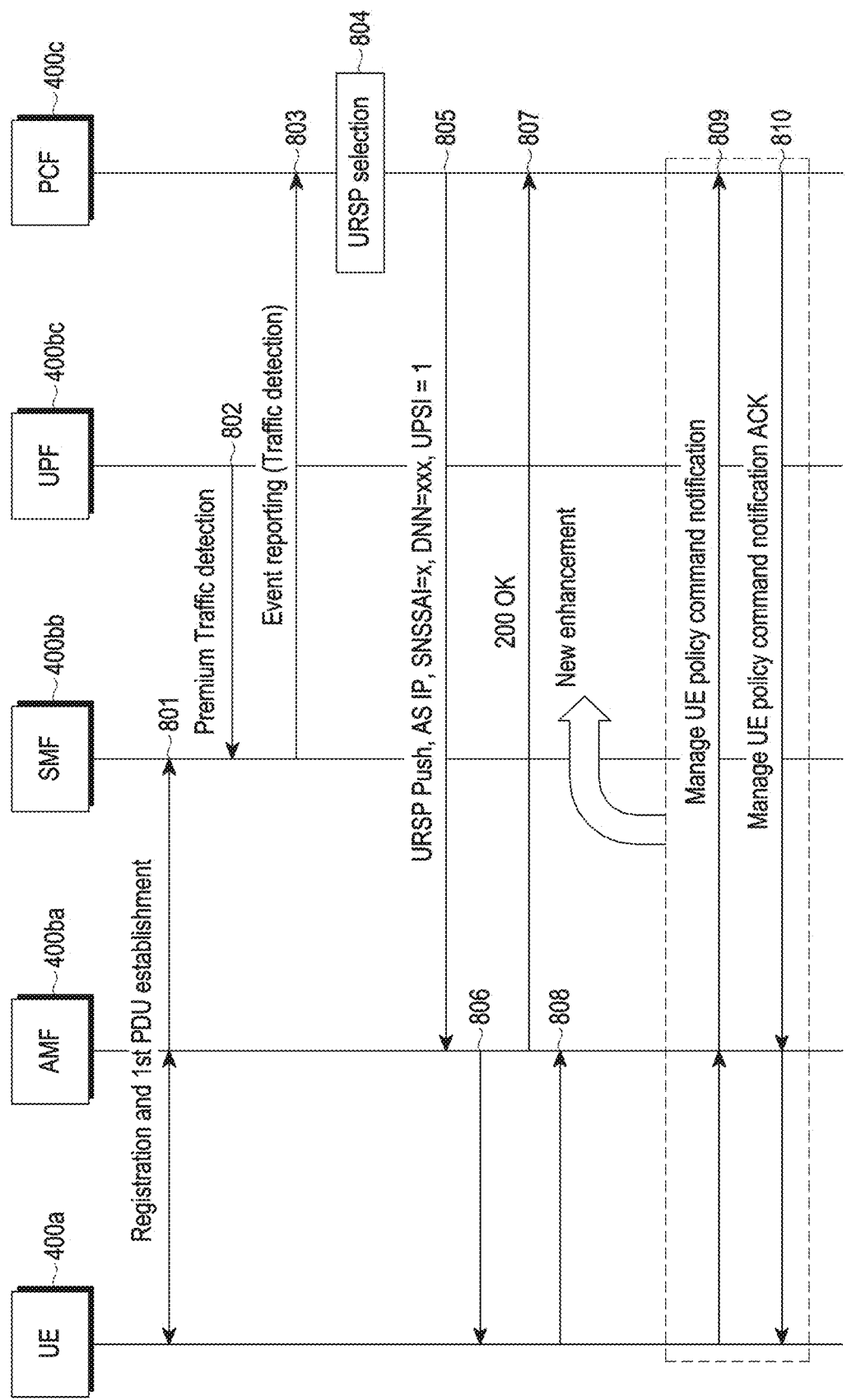
FIG. 8 is a sequence diagram illustrating a method for controlling a UE policy in a wireless network, according to an embodiment of the disclosure.

FIG. 8 is a sequence diagram illustrating a method for controlling a UE policy in a wireless network, according to another embodiment of the disclosure.

At 801-808, at 801, the UE 400a performs registration procedure as per 3GPP call flow defined in TS 23.502 and 23.503. The UE 400a establishes PDN connection alongside the registration procedure as defined in TS 23.502, and 23.503. At 802, the UPF 400bc, shares the traffic patterns and relevant metadata to the SMF 400bb for closed loop automation between the SMF 400bb and the UPF 400bc. The NWDAF will provide non-real-time models, however, as the UPF 400bc is not on the SBI interface, it cannot share metadata directly to NWDAF. At 803, after parsing and digesting the periodic feedback from the UPF 400bc, the SMF 400bb triggers event reporting to the PCF 400c. The event reporting enables the PCF 400c with appropriate URSP selection at 804. At 805, the PCF 400c pushes appropriate URSP to the UE 400a via the AMF 400ba. These URSP policies are transparent to the AMF 400ba. At 806-808, the UE 400a acknowledges the URSP policies. At 809-810, are the novel notifications and acknowledgement to sync and maintain single source of truth. Through these notifications and acknowledgement, the network functions and entities will know whether any policy has not been executed by the UE 400a on/in a particular day/time-interval; whether the UE 400a is interested in applying the UE policies given by the PCF 400c, if no, then why. These kinds of crucial information is missing currently and that's why the source of truth may not be the PCF 400c entirely as without this novel proposition, the PCF 400c may not be aware of UE's intentions, problems, technical issues with policies, and other hidden problems.

At 809-810, a new message communication (i.e. feedback message/manage UE policy command notification/manage UE policy command notification acknowledgment) has to be been defined in between the UE 400*a* and the PCF 400*c* to exchange status of UE policy usage notification, as per 3GPP TS 24.501.

In an embodiment, the manage UE policy command notification is sent by the UE 400*a* to the PCF 400*c* to update the UE policy. Detailed information of the manage UE policy command notification is given in Table 4, as per 3GPP TS24.501, 502.

TABLE 4

| Information Element | Type/Reference | Presence | Format | Length |
|---|---|---|---|---|
| PTI | Procedure transaction identity 9.6 | M | V | 1 |
| UE policy usage notification message identity | UE policy delivery service message type | M | V | 1 |
| UE policy section management list | UE policy section management list D.6.2 | M | LV-E | 11-65537 |
| Policy status | Policy application status in UE (New Type) ENUM [Applied/failed/saved] | M | V | 1 |
| Fail reason | Policy application failure reason (New type) | O | V | 1 |
| Error received | Peer Error (New Type) | O | V | 1 |
| Current tracking area identity | 5GS tracking area identity 9.11.3.8 | O | TV | 7 |

In an embodiment, a purpose of an error received is to indicate the reason sent by a peer node (e.g. network entity 400*b*) when it rejected the policy application and message type is TBD.

In an embodiment, the purpose of the policy application failure reason is to indicate the reason why the UE 400*a* was unable to apply the UE policy. The policy application failure reason is a type 3 information element with 2 octet's length and can be coded as in Tables 5 or 6.

TABLE 5

| 8 | 7 | 6 | 5 | 4 | 3 | 2 | 1 | |
|---|---|---|---|---|---|---|---|---|
| Policy application failure reason IEI | | | | | | | | octet 1 |
| Reason value | | | | | | | | octet 2 |

TABLE 6

| 8 | 7 | 6 | 5 | 4 | 3 | 2 | 1 | |
|---|---|---|---|---|---|---|---|---|
| 0 | 0 | 0 | 0 | 0 | 0 | 1 | 1 | Failed at UE |
| 0 | 0 | 0 | 0 | 0 | 1 | 0 | 1 | Failed at AMF |
| 0 | 0 | 0 | 0 | 0 | 1 | 1 | 0 | Failed at SMF |
| 0 | 0 | 0 | 0 | 0 | 1 | 1 | 1 | Failed at UPF |
| 0 | 0 | 0 | 0 | 1 | 0 | 0 | 1 | Failed at gNB |
| 0 | 0 | 0 | 0 | 1 | 0 | 1 | 0 | Failed at Non-3GPP Node |

In an embodiment, the manage UE policy command notification acknowledgment is sent by the PCF 400*c* to the UE 400*a*. Detailed information of the manage UE policy command notification acknowledgment is given in Table 7.

TABLE 7

| IEI | Information element | Type/Reference | Presence | Format | Length |
|---|---|---|---|---|---|
| | PTI | Procedure transaction identity 9.6 | M | V | 1 |
| | UE policy usage notification ACK message message identity | UE policy delivery service message type | M | V | 1 |

In an embodiment, a manage UE policy usage notification call flow in the 5G network includes a storage mechanism for these status notifications and provision to access the notification based on any criteria such as ID, timeline, notification status, network slice, or any other customized grouping or searching measure(s) or condition(s).

In another embodiment, the method includes stateless implementation of status notifications and its storage at the PCF 400*c* or sub-function in the PCF 400*c* in cloud-native or cloud deployments and the UE 400*a* or the PCF 400*c* may register to standard Application Program Interfaces (APIs) or server less computing constructs to realize platform-agnostic notification lifecycle management functionalities such as subscription, publishing, termination, modification.

In another embodiment, the method includes enabling prediction at network-wide or network-slice specific PCF based on the notification metadata such as status, frequency, periodicity, statistics, network & UE conditions. Further, the method includes predicting and managing at least a part (partial) of the UE policies based on notification metadata based on UE-awareness and network-awareness; and predicting and managing geospatial network state or network slice state using the notification metadata and statistical inferences made out of it.

In another embodiment, the method includes seamlessly communicating the UE-policy status notification when the UE 400*a* communicates via ANDSF or Hotspot 2.0 or any similar technology; syncing between the ANDSF and the PCF 400*c* at least subset of the URSP policies (or part of the policy) to a single or a group of users periodically; and predicting and dynamically evaluating the sync periodicity. Syncing at network-wide level or network-slice specific level.

In another embodiment, the method includes assigning a specific sub-function of the PCF 400*c* (inside PCF or a separate implementation) for constantly listening for the policies' notifications; push as well pull-based notification from the PCF sub-function to know the status of at least a portion of URSP policy status at UE side, and the PCF 400*c* in the discussion can be network-wide or network slice-specific.

Figure 9:
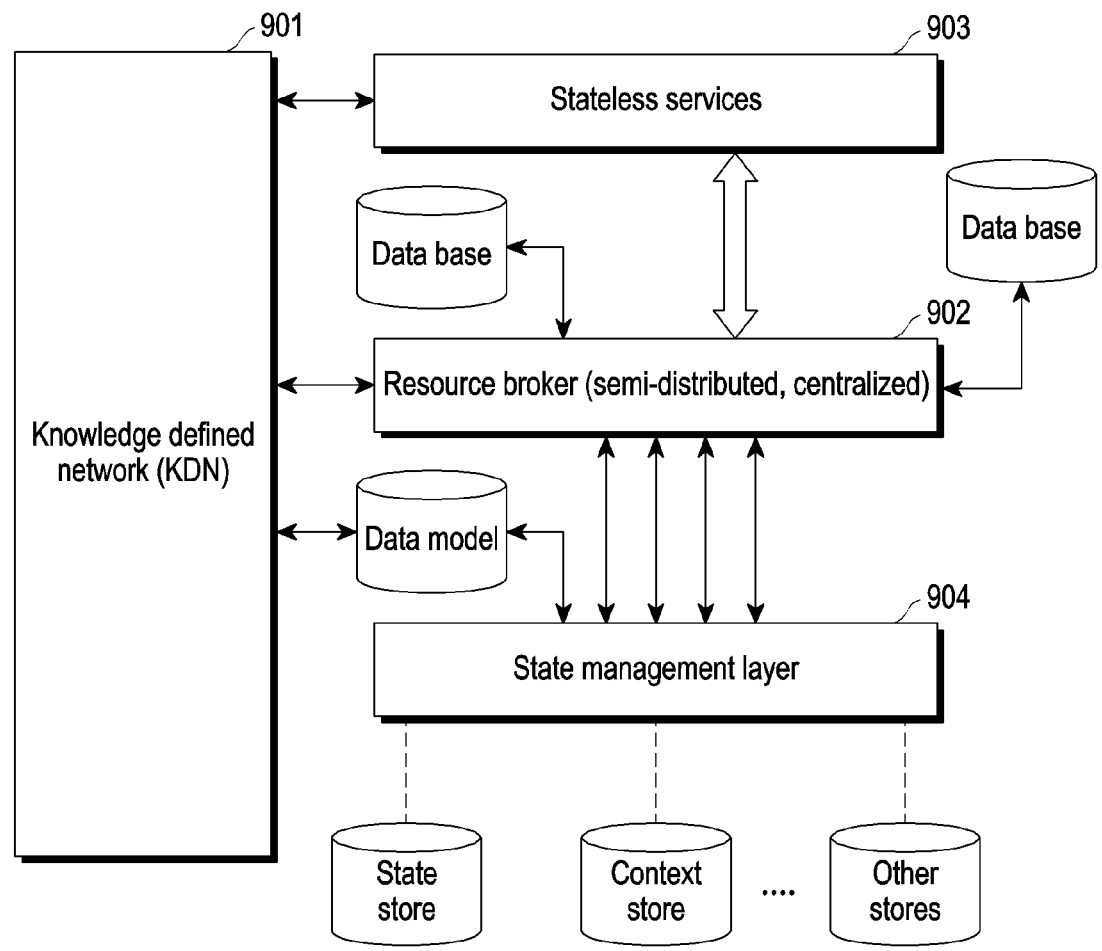
FIG. 9 illustrates a cloud-native mechanism and a server less mechanism, according to an embodiment of the disclosure.

FIG. 9 illustrates a cloud-native mechanism and a server less mechanism, according to an embodiment of the disclosure.

Referring to FIG. 9, a cloud-native mechanism 900, in case of cloud-native approach:

a) All the stateless applications/services 903 such as the PCF 400*c*, ANDSF/Hotspot 2.0 or PCF sub functions which may be hosted as a separate network function (NF) or integrated with the PCF 400*c*, will be hooked to a resource broker (RB) 902 which can be centralized, semi-distributed or completed distributed.

b) The RB 902 maintains its own internal DB for management & control purposes. These internal distributed may be multiple or single with redundancy support to address single-point-of-failure.

c) The RB 902 enables push as well as pull based mechanism at an attribute-level fine-grained triggers/events.

d) A lean data-model driven state management layer 904 is connected with the RB for bi-directional data/stream flow.

e) The data model may be provided by authenticated role manually or can be automatically generated with the help of novel parser by taking inputs from Knowledge Defined Network (KDN) subsystem 901.

f) The KDN 901 may be an external or internal subsystem which provide the predictive inputs for auto-data model generation and service on-boarding.

g) The KDN 901 can further improvise the RB 902 efficiency in terms of optimize distributed stream processing, storage and retrieval of data, events, and triggers.

h) The independent storage/repositories maintain relevant metadata which include, but not limited to, context, sessions, slices/sub slices metadata, connections, demographics, states, handles, IDs, etc. These independent repositories are managed by the lean state management layer 904.

In server less approach:

a) The RB 902 may be residing in cloud and may be a third party service. The RB 902 may be accessible via service-specific APIs provided by the third party or by a generic common interface APIs.

b) The RB 902 server less APIs may take/return the data from/to KDN subsystem 901.

c) Remaining functionality will be similar to that of cloud native approach.

In case of the UE 400a, the notifications and metadata will be saved within the user's device or user authenticated cloud devices. The UE 400a uses Hypertext Transfer Protocol (HTTP) API to interact with cellular network entities for subscription, publication and its modification/termination. It is the responsibility of the cloud service provider to provide a platform agnostic APIs to serve the operations such as subscription, publication, modification, and termination. The KDN subsystem (901) enables network-wide or sub slice-specific predictive/prescriptive recommendations based on the notifications patterns and metadata such as status, frequency, periodicity, statistics, and network and UE conditions.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art will that various changes in form and details may be made therein without departing from the spirit and scope of the disclosure as defined by the appended claims and their equivalents.

What is claimed is:

1. A method for controlling at least one user equipment (UE) policy by a UE in a wireless network, the method comprising:

receiving at least one first UE policy from a policy control function (PCF);

performing, in response to receiving the at least one first UE policy, at least one first action from a successful execution of the at least one first UE policy, a failed execution of the at least one first UE policy, and storing of the at least one first UE policy;

transmitting a feedback message to the PCF based on the at least one first action; and receiving, from the PCF, at least one second UE policy modified from the at least one first UE policy, in response to a number of feedback messages indicating the failed execution of the at least one first UE policy transmitted to the PCF being greater than a threshold value, wherein based on the at least one first UE policy comprising a wireless local area network selection policy (WLANSP) rule, the feedback message indicating the failed execution of the at least one first UE policy includes reason information of the failed execution indicating that the UE was not able to install the WLANSP rule to connect to a non-3rd generation partnership project (3GPP) network, time information of a handover to the non-3GPP network, and location information including a tracking area or service set identifier (SSID) information.

2. The method of claim 1, wherein the at least one first UE policy further comprises a UE route selection policy (URSP).

3. The method of claim 2, wherein the URSP comprises:

a storage mechanism for the feedback message, wherein the feedback message comprises a plurality of status notifications, the plurality of status notifications classified in various categories, wherein the various categories comprise a failure, alert, warning, mixed criteria based on parameters including identity (ID), timeline, notification status, slices, sub slices, geospatial data, or any other customized dynamic metadata or condition, and the various categories used as query filter criteria, and wherein the PCF or any other relevant entity access a subset of relevant notifications based on the query filter criteria.

4. The method of claim 2, wherein the URSP comprises a session and service continuity (SSC) mode selection policy (SSCMSP), a network slice selection policy (NSSP), a data network name (DNN) selection policy, a protocol data unit (PDU) session type policy, a non-seamless offload policy, and an access type preference policy.

5. The method of claim 1, wherein the feedback message comprises a reason for the failed execution of the at least one first UE policy.

6. A method for controlling at least one user equipment (UE) policy by a policy control function (PCF) in a wireless network, the method comprising:

transmitting at least one first UE policy to a UE;

receiving a feedback message from the UE based on at least one first action performed by the UE based on the at least one first UE policy, wherein the at least one first action is from a successful execution of the at least one first UE policy, a failed execution of the at least one first UE policy, and storing of the at least one first UE policy;

modifying the at least one first UE policy to at least one second UE policy, a number of feedback messages indicating the failed execution of the at least one first UE policy received from the UE being greater than a threshold value; and transmitting the at least one second UE policy to the UE,
wherein based on the at least one first UE policy comprising a wireless local area network selection policy (WLANSP) rule, the feedback message indicating the failed execution of the at least one first UE policy includes reason information of the failed execution indicating that the UE was not able to install the WLANSP rule to connect to a non-3rd generation partnership project (3GPP) network, time information of a handover to the non-3GPP network, and location information including a tracking area or service set identifier (SSID) information.

7. A user equipment (UE) for controlling at least one UE policy in a wireless network, the UE comprising:
a memory; and
at least one processor coupled to the memory, wherein the at least one processor is configured to:
receive at least one first UE policy from a policy control function (PCF),
perform, in response to receiving the at least one first UE policy, at least one first action from a successful execution of the at least one received UE policy, a failed execution of the at least one first UE policy, and storing of the at least one first UE policy,
transmit a feedback message to the PCF based on the at least one first action, and
receive, from the PCF, at least one second UE policy modified from the at least one first UE policy, in response to a number of feedback messages indicating the failed execution of the at least one first UE policy transmitted to the PCF being greater than a threshold value,
wherein based on the at least one first UE policy comprising a wireless local area network selection policy (WLANSP) rule, the feedback message indicating the failed execution of the at least one first UE policy includes reason information of the failed execution indicating that the UE was not able to install the WLANSP rule to connect to a non-3rd generation partnership project (3GPP) network, time information of a handover to the non-3GPP network, and location information including a tracking area or service set identifier (SSID) information.

8. The UE of claim 7, wherein the at least one first UE policy further comprises a UE route selection policy (URSP).

9. The UE of claim 8,
wherein the URSP comprises:
a storage mechanism for the feedback message,
wherein the feedback message comprises a plurality of status notification, the plurality of status notification classifies in various categories,
wherein the various categories comprise a failure, alert, warning, mixed criteria based on parameters including Identity (ID), timeline, notification status, slices, sub slices, geospatial data, or any other customized dynamic metadata or condition,
wherein the various categories are used as query filter criteria, and
wherein the PCF or any other relevant entity access a subset of relevant notifications based on the query filter criteria.

10. The UE of claim 8, wherein the URSP comprises a session and service continuity (SSC) mode selection policy (SSCMSP), a network slice selection policy (NSSP), a data network name (DNN) selection policy, a protocol data unit (PDU) session type policy, a non-seamless offload policy, and an access type preference policy.

11. The UE of claim 8, wherein the feedback message comprises a reason for the failed execution of the at least one first UE policy.

12. An apparatus for implementing policy control function (PCF) for controlling at least one user equipment (UE) policy in a wireless network, the PCF comprising:
a memory; and
at least one processor coupled to the memory, wherein the at least one processor is configured to:
transmit at least one first UE policy to a UE,
receive a feedback message from the UE based on at least one first action performed by the UE based on the at least one first UE policy, wherein the at least one first action is from a successful execution of the at least one first UE policy, a failed execution of the at least one first UE policy, and storing of the at least one first UE policy,
modify the at least one first UE policy to at least one second UE policy, a number of feedback messages indicating the failed execution of the at least one first UE policy received from the UE being greater than a threshold value, and
transmit the at least one second UE policy to the UE,
wherein based on the at least one first UE policy comprising a wireless local area network selection policy (WLANSP) rule, the feedback message indicating the failed execution of the at least one first UE policy includes reason information of the failed execution indicating that the UE was not able to install the WLANSP rule to connect to a non-3rd generation partnership project (3GPP) network, time information of a handover to the non-3GPP network, and location information including a tracking area or service set identifier (SSID) information.

13. The apparatus of claim 12, wherein the at least one first UE policy further comprises a UE route selection policy (URSP).

14. The apparatus of claim 13,
wherein the URSP comprises:
a storage mechanism for the feedback message,
wherein the feedback message comprises a plurality of status notifications, the plurality of status notification classifies in various categories,
wherein the various categories comprise failure, alert, warning, mixed criteria based on parameters including identity (ID), timeline, notification status, slices, sub slices, geospatial data, or any other customized dynamic metadata or condition,
wherein the various categories are used as query filter criteria, and
wherein the PCF or any other relevant entity access a subset of relevant notifications based on the query filter criteria.

15. The apparatus of claim 13, wherein the URSP comprises a session and service continuity (SSC) mode selection policy (SSCMSP), a network slice selection policy (NSSP), a data network name (DNN) selection policy, a protocol data unit (PDU) session type policy, a non-seamless offload policy, and an access type preference policy.

16. The apparatus of claim 12, wherein the feedback message comprises a reason for the failed execution of the at least one first UE policy.

* * * * *